(12) United States Patent
Galasso

(10) Patent No.: US 8,901,419 B2
(45) Date of Patent: Dec. 2, 2014

(54) RISING RECEPTACLE BOX ASSEMBLY

(75) Inventor: Marc Galasso, Beacon Falls, CT (US)

(73) Assignee: The Wiremold Company, West Hartford, CT (US)

( * ) Notice: Subject to any disclaimer, the term of this patent is extended or adjusted under 35 U.S.C. 154(b) by 91 days.

(21) Appl. No.: 13/495,472

(22) Filed: Jun. 13, 2012

(65) Prior Publication Data
US 2013/0023149 A1 Jan. 24, 2013

Related U.S. Application Data

(60) Provisional application No. 61/496,354, filed on Jun. 13, 2011, provisional application No. 61/638,179, filed on Apr. 25, 2012.

(51) Int. Cl.
H01R 13/46 (2006.01)
H01R 13/453 (2006.01)
H02G 3/18 (2006.01)

(52) U.S. Cl.
CPC ........... *H01R 13/4536* (2013.01); *H02G 3/185* (2013.01); *H01R 13/4538* (2013.01)
USPC ................. 174/53; 174/55; 174/57; 439/142; 312/223.6

(58) Field of Classification Search
USPC .............. 174/53, 55, 57; 439/142; 312/223.6, 312/328
See application file for complete search history.

(56) References Cited

U.S. PATENT DOCUMENTS

| 3,433,886 | A | * | 3/1969 | Myers .............................. 174/57 |
| 4,372,629 | A | * | 2/1983 | Propst et al. ................ 312/223.6 |
| 4,984,982 | A | * | 1/1991 | Brownlie et al. ............. 439/131 |
| 5,230,552 | A | * | 7/1993 | Schipper et al. ........... 312/223.6 |
| 5,387,761 | A |   | 2/1995 | Simonis |
| 5,575,668 | A | * | 11/1996 | Timmerman ................. 439/131 |
| 5,980,279 | A | * | 11/1999 | Muller .......................... 439/142 |
| 7,301,100 | B2 | * | 11/2007 | Drane et al. .................... 174/67 |
| 2004/0147147 | A1 |   | 7/2004 | Griepentrog |

FOREIGN PATENT DOCUMENTS

WO 03077377 A1 9/2003

OTHER PUBLICATIONS

International Search Report for corresponding PCT Application No. PCT/US2012/042211 dated Dec. 26, 2012.

* cited by examiner

Primary Examiner — Dhirubhai R Patel
(74) Attorney, Agent, or Firm — McCormick, Paulding & Huber LLP

(57) ABSTRACT

A rising receptacle box assembly includes a receptacle assembly for housing receptacles and jacks. The receptacle assembly can move between a lowered position and a raised position. In the raised position, the receptacle assembly is substantially level with a work surface on which the rising receptacle box assembly is supported, so that the receptacles and jacks are easily accessible. In the lowered position, the receptacle assembly is lowered beneath the work surface so that inserted plugs and connectors are stowed away in a recess below the work surface. Raising and lowering of the receptacle assembly can be coupled to the opening and closing of a lid of the rising receptacle box assembly. The lid may include one or more cutouts so that cables associated with inserted plugs and connectors can pass through when the receptacle assembly moves to the lowered position.

19 Claims, 8 Drawing Sheets

US 8,901,419 B2

RISING RECEPTACLE BOX ASSEMBLY

CROSS REFERENCE TO RELATED APPLICATIONS

The present application claims the benefit of the filing dates of Provisional Application Ser. No. 61/496,354, filed Jun. 13, 2011, and Provisional Application Ser. No. 61/638,179, filed Apr. 25, 2012, which applications are hereby incorporated by reference in their entireties.

FIELD OF INVENTION

The invention relates to surface-mounted receptacle boxes for power and data connections.

BACKGROUND

Receptacles and jacks may be provided in assemblies that are flush mounted on a work surface. In some assemblies, the receptacles and jacks are provided on an assembly surface that is substantially level with the work surface. While this type of configuration provides easy access to the receptacles and jacks, it creates an obstruction on the work surface when plugs and connectors are inserted into them. In other assemblies, the receptacles and jacks are provided on an assembly surface that is recessed from the work surface. While this type of configuration allows inserted plugs and connectors to be disposed in a recess below the work surface, it makes access to the receptacles and/or jacks more difficult. Accordingly, there is a need for an improved assembly.

SUMMARY

In one embodiment, a rising receptacle box assembly for flush installation on a work surface includes a support frame, a lid movably mounted on the support frame by a guiding mechanism for guiding the movement of the lid relative to the support frame, and a receptacle assembly configured to be raised and lowered within the support frame by a translating mechanism. In one embodiment, the lid is operably connected to the receptacle assembly so that movement of the lid from a closed position to an open position causes movement of the receptacle assembly from a lowered position to a raised position, and vice versa. Also, the movement of the lid from an open position to a closed position causes movement of the receptacle assembly from a raised position to a lowered position, and vice versa. In other embodiments, the movement of the lid may be independent from the movement of the receptacle assembly. Accordingly, in some embodiments, the lid may be opened and closed without raising and lowering the receptacle assembly.

Further, in some embodiments of the above rising receptacle box assembly, the translating mechanism for raising and lowering the receptacle assembly may include a gear and a rack and pinion arrangement. The gear may be connected to the lid such that the opening and closing motion of the lid causes the gear to rotate. The pinion may be configured to engage the gear such that rotation of the lid causes rotation of the pinion. The rack may be configured to engage the pinion and may be fixed to the receptacle assembly such that rotation of the lid causes vertical translation of the rack and the receptacle assembly. Further, in other embodiments, the translating mechanism may comprise a motorized linear actuator for raising and lowering the receptacle assembly. In still other embodiments, the translating mechanism may be a system of linkages between the lid and the receptacle assembly.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific embodiments disclosed. In the drawings.

DETAILED DESCRIPTION

Figure 1:
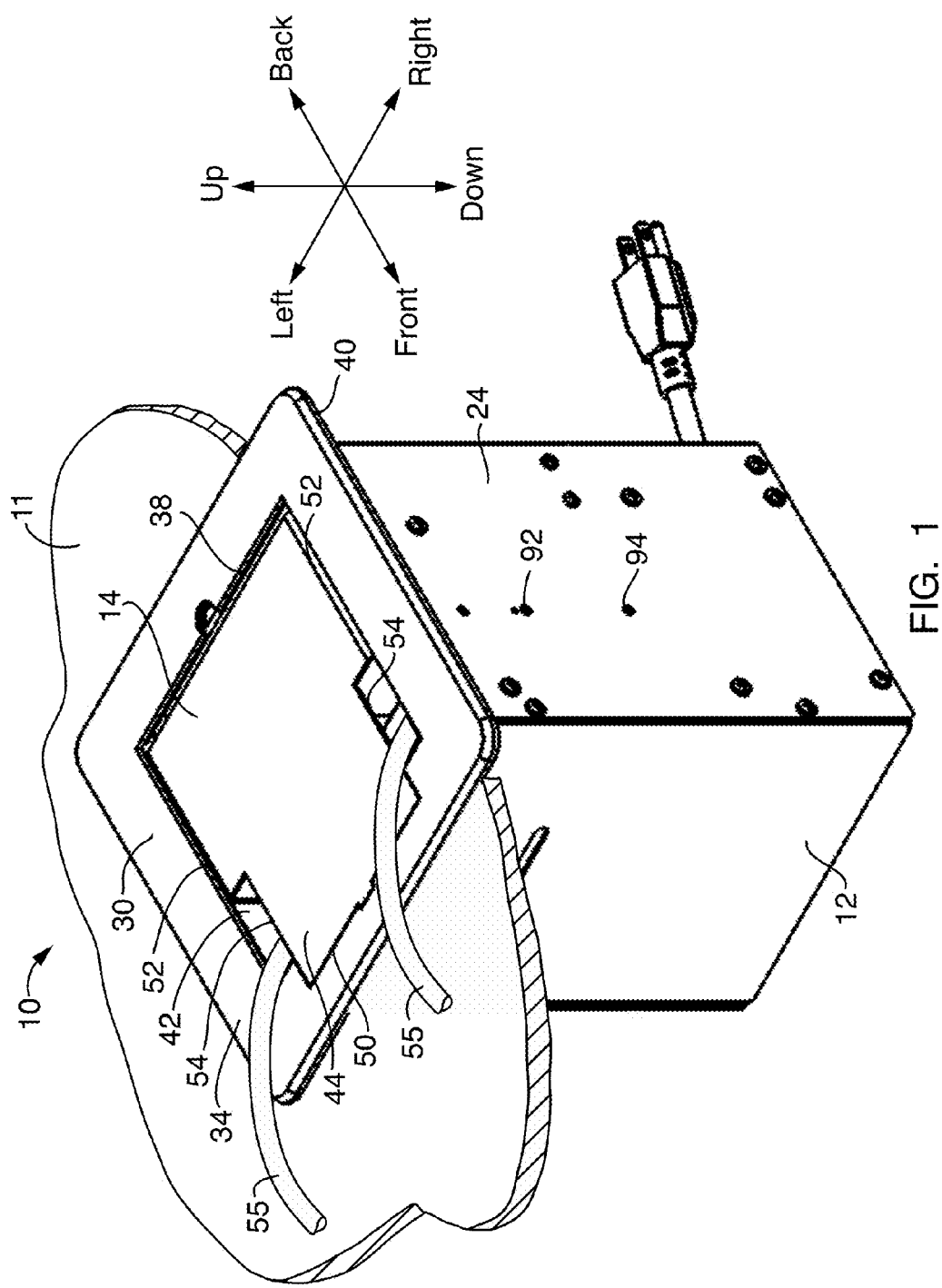
FIG. 1 is a perspective view of an illustrative embodiment of a rising receptacle box assembly with the lid in a closed position.

Referring to FIGS. 1-8, a rising receptacle box assembly 10 for flush installation on a work surface 11 (e.g. tabletop, floor, etc.) comprises a support frame 12, a lid 14 movably mounted on the support frame 12 by a guiding mechanism 18 for guiding the movement of the lid 14 relative to the support frame 12, and a receptacle assembly 20 configured to be raised and lowered within the support frame 12 by a translating mechanism 22. The lid 14 may be operably connected to the receptacle assembly 20 such that movement of the receptacle assembly 20 from the lowered position to the raised position occurs in conjunction with movement of the lid 14 from the closed position to the open position. For example, in one embodiment, the lid 14 may be operably connected to the receptacle assembly 20 so that movement of the lid 14 from a closed position to an open position causes movement of the receptacle assembly 20 from a lowered position to a raised position, and vice versa. Also, the movement of the lid 14 from an open position to a closed position may cause movement of the receptacle assembly 20 from a raised position to a lowered position, and vice versa. In another embodiment, the movement of the lid 14 is not coupled to the movement of the receptacle assembly 20.

Figure 3:
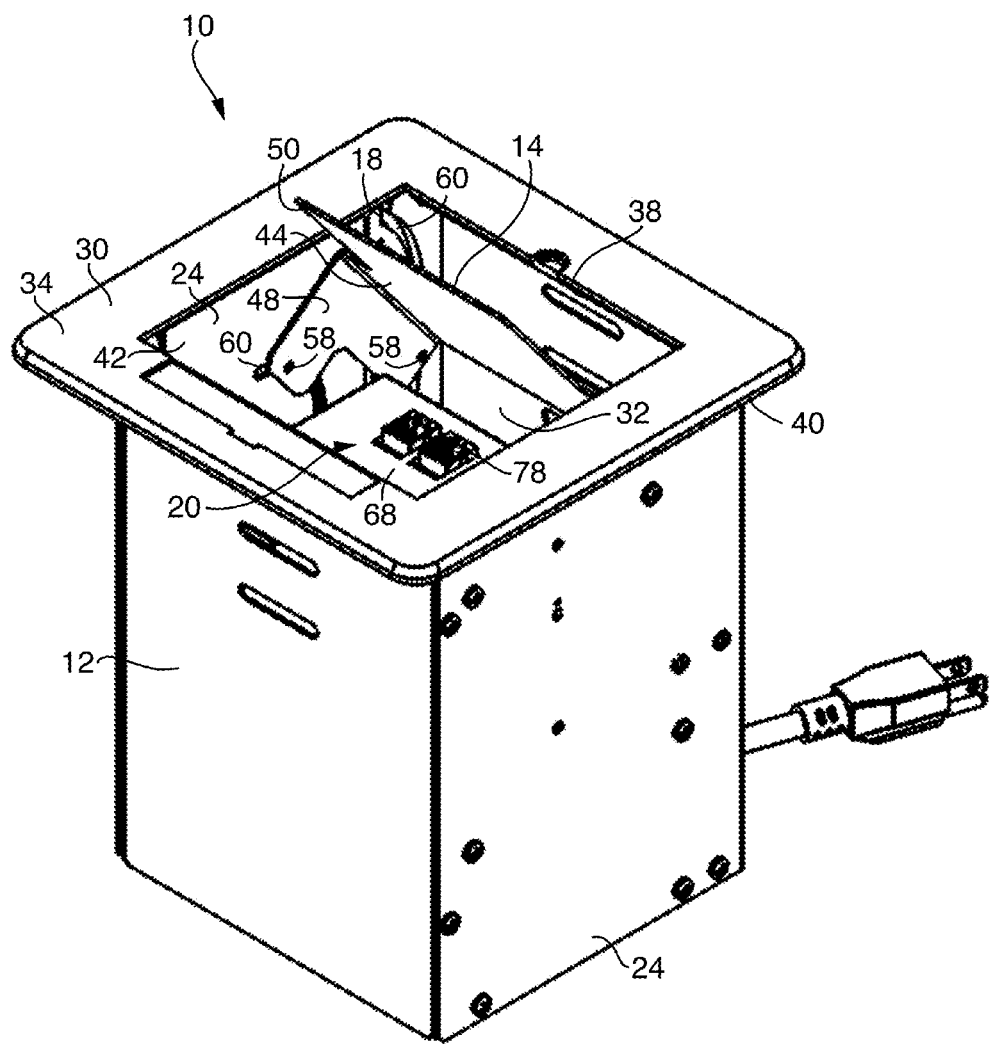
FIG. 3 is a perspective view of the rising receptacle box assembly of FIG. 1 with the lid in an intermediate position.
Figure 4:
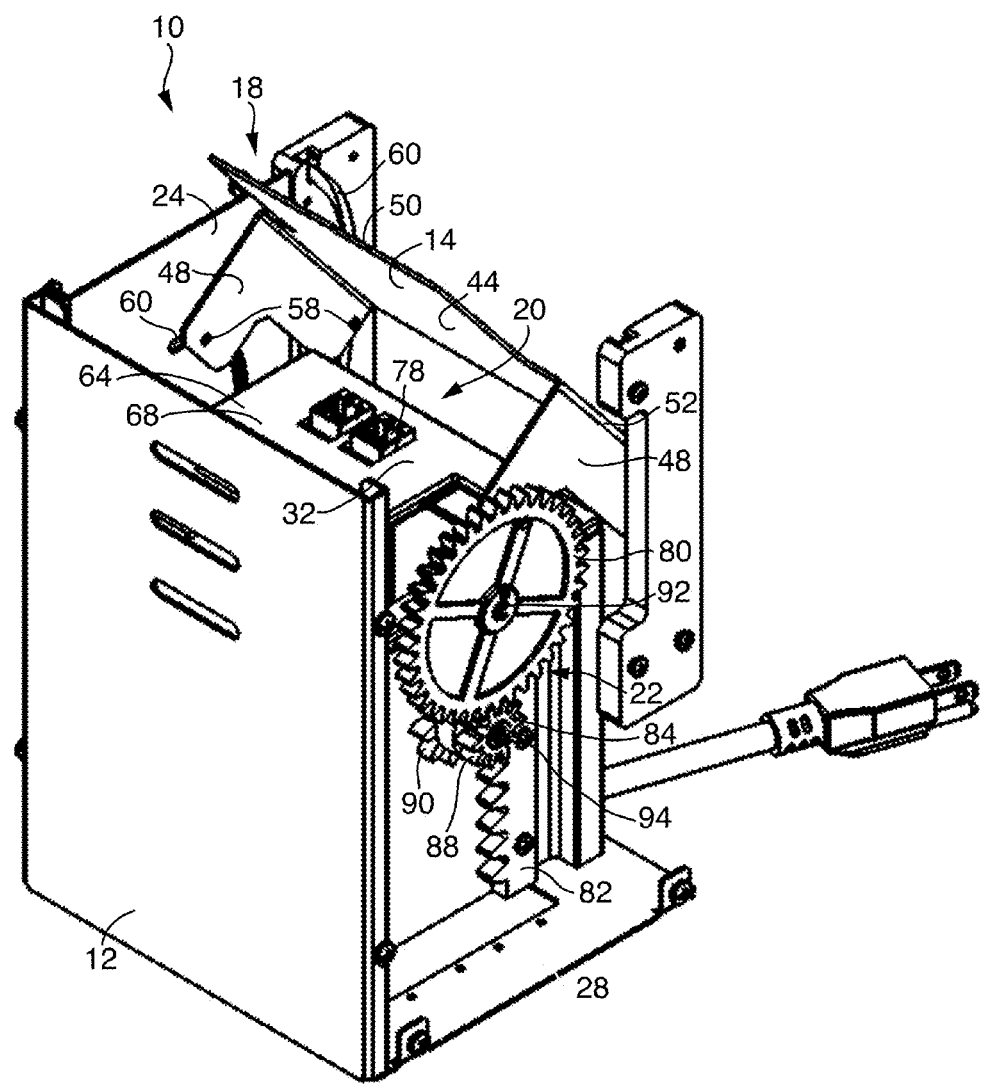
FIG. 4 is a cutaway view of the rising receptacle box assembly of FIG. 1 with the lid in an intermediate position.

As shown in FIGS. 3-4, the support frame 12 may be configured to support the lid 14, the guiding mechanism 18, the receptacle assembly 20 and the translating mechanism 22 in relationship with each other and in relation to the work surface 11 on which the rising receptacle box assembly 10 is installed. The support frame 12 may comprise any suitable construction for supporting the lid 14, the guiding mechanism 18, the receptacle assembly 20 and the translating mechanism 22 in relationship with each other as described in more detail below.

As shown in FIGS. 3-4, the support frame 12 may comprise lateral support members 24, a bottom support member 28 and a flange 30. The lateral support members 24, the bottom support member 28 and the flange 30 may be integrally formed together or may be formed as separate members that are connected together to define the support frame 12. The lateral support members 24, the bottom support member 28 and the flange 30 may be connected together by any suitable means, such as welding, fasteners, etc. As shown in FIGS. 3-4, the lateral support members 24, the bottom support member 28 and the flange 30 may be configured to form a box enclosure that defines an inner space 32. Also, as shown in FIGS. 3-4, the flange 30 preferably has a substantially planar surface 34 that defines an inner edge 38 and an outer edge 40. Further, the flange 30 may define an upper opening 42 to the support frame 12. The support frame 12 may be adapted to be installed through an opening on a work surface 11 such that the planar surface 34 of the flange 30 is substantially level with the work surface 11. In one embodiment, for example, the outer edge 40 abuts the work surface 11 and allows the support frame 12 to be installed into an appropriately sized opening such that the support frame 12 extends into and through the opening of the work surface 11 without falling through.

Figure 5:
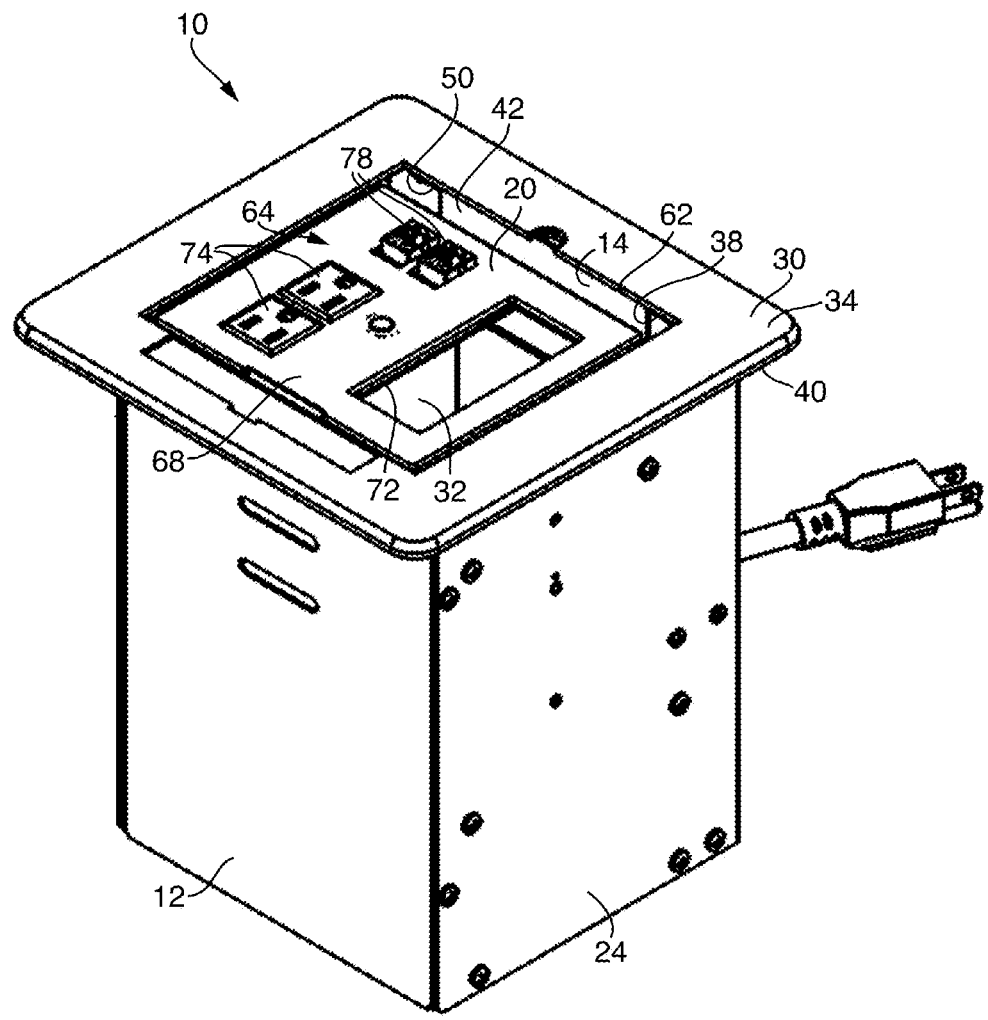
FIG. 5 is a perspective view of the rising receptacle box assembly of FIG. 1 with the lid in an open position.
Figure 6:
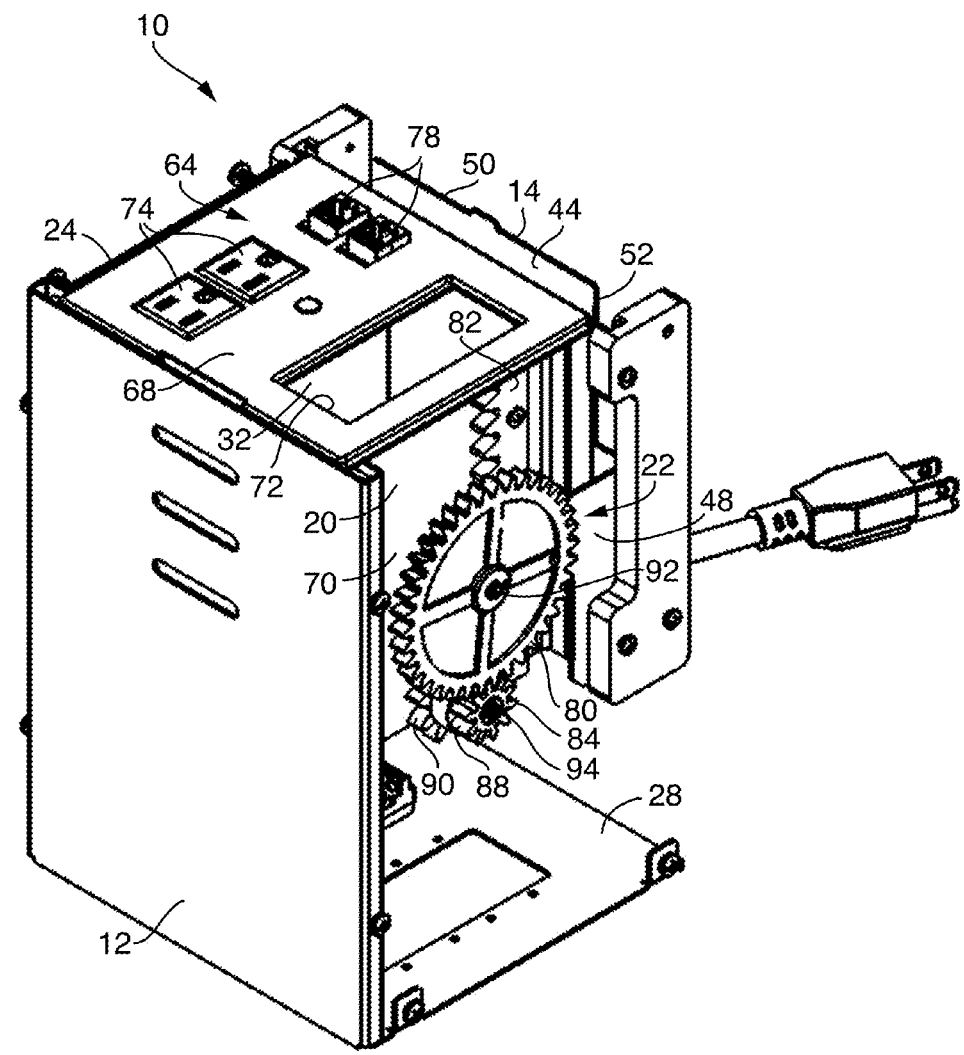
FIG. 6 is a cutaway view of the rising receptacle box assembly of FIG. 1 with the lid in an open position.
Figure 7:
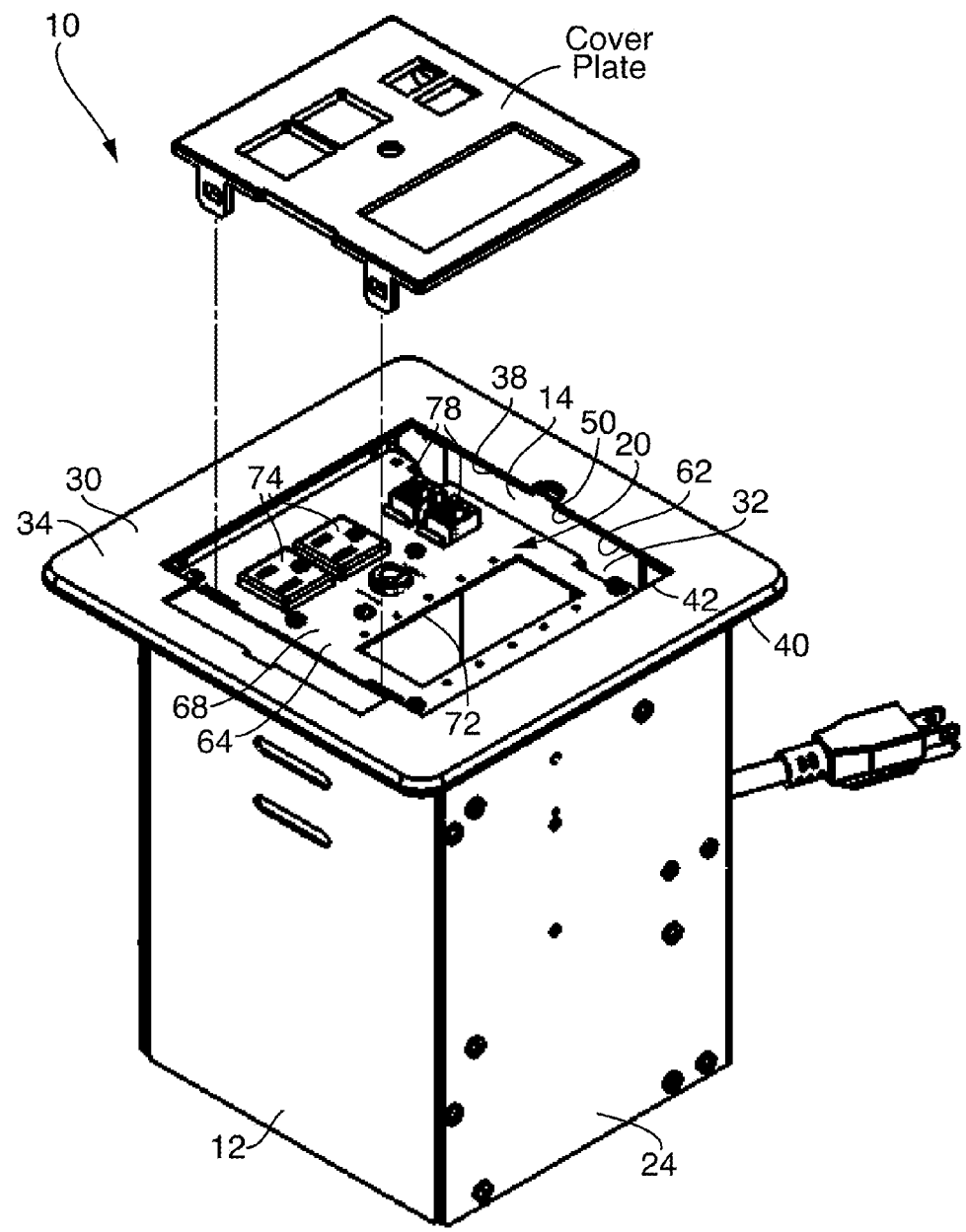
FIG. 7 is a perspective view of the rising receptacle box assembly of FIG. 1 with a cover plate.

The lid 14 may be adapted to cover at least some portion of the upper opening 42 of the support frame 12 in a closed position (see FIGS. 1-2) and to retract into the support frame 12 when the lid 14 is moved into an open position (see FIGS. 5-6). As shown in FIGS. 2 and 4, the lid 14 may comprise a substantially planar surface 44 and lateral support portions 48 that extend from the surface 44 in a transverse direction to the surface 44. The surface 44 defines a front edge 50 and lateral edges 52. The lateral support portions 48 are also preferably planar and extend from the lateral edges 52 of the surface 44 in a transverse direction to the surface 44. Additionally, the surface 44 of the lid 14 may further define at least one cutout 54. The cutout 54 in the surface 44 of the lid 14 is configured so that cables 55 can pass through into the inner space 32 of the support frame 12 when the lid 14 is closed (see FIGS. 1-2).

The guiding mechanism 18 may be configured such that, in the closed position (see FIGS. 1-2), the lid 14 is substantially flush with a surface on which the support frame 12 is mounted and, in an open position (see FIGS. 5-6), the lid 14 is substantially vertical and retracted into the support frame 12. For example, as shown in FIGS. 3-4, the guiding mechanism 18 may comprise pins 58 provided on the lateral support portions 48 of the lid 14 and tracks 60 provided on the lateral support members 24 of the support frame 12. The pins 58 may be configured to slidably engage the tracks 60 for guiding the movement of the lid 14 from a closed position to an open position, and vice versa. As shown in FIGS. 3-4, the tracks 60 preferably follow a generally curvilinear shape. Also, as shown in FIGS. 3-4, the tracks 60 may be separately formed and attached to the lateral support members 24 of the support frame 12. Alternatively, the tracks 60 may be integrally formed in the lateral support members 24 of the support frame 12 (e.g. grooves formed in the lateral support members 24 of the support frame 12 or slots cut out of the lateral support members 24 of the support frame 12). Although the guiding mechanism 18 is herein described with reference to the pins 58 and the tracks 60 of a preferred embodiment, the guiding mechanism 18 may be provided by other suitable structures and/or mechanisms known in the art.

Further, in embodiments where the movement of the lid 14 is coupled to the movement of the receptacle assembly 20, the guiding mechanism 18 is preferably configured to guide the lid 14 into a locked position when moved into a fully open position. Otherwise, when trying to plug devices into power receptacles 74 or jacks 78 by exerting a downward force on the receptacle assembly 20, the lid 14 would inadvertently move to a closed position. For example, the tracks 60 may be configured so that the lid 14 moves into a fully open position and engages an interference 62 such that the lid 14 cannot move into a closed position without the lid 14 being manipulated to disengage the interference 62, as best seen in FIG. 5.

In a preferred embodiment shown in FIGS. 5-6, the interference 62 may be provided by the inner edge 38 formed by the flange 30 on the back terminal edge 212 of the support frame 12. In this embodiment, the tracks 60 may be configured to guide the lid 14 into a position where the inner edge 38 formed by the flange 30 engages the front edge 50 of the lid 14 when the lid 14 is moved into a fully open position (see FIGS. 5-6). Thus, the inner edge 38 formed by the flange 30 interferes with the movement of the lid 14 into a closed position, and the lid 14 cannot be moved into a closed position without being manipulated to disengage the interference 62. Thus, in order to move the lid 14 into a closed position, the front edge 50 of the lid 14 has to be disengaged from the inner edge 38 of the flange 30 by pulling the front edge 50 of the lid 14 forward.

Alternatively, in another embodiment, interferences 62 (e.g., notches, recesses not shown) may be provided on the tracks 60 so that the pins 58 provided on the lid 14 engage the interferences 62 (e.g., notches, recesses not shown) on the tracks 60 as the lid 14 moves into a fully open position. Thus, the lid 14 cannot move into a closed position without the lid 14 being manipulated to disengage the pins 58 from interferences 62 (e.g., notches, recesses not shown) on the tracks 60. It should be understood that the lid 14 can be in the form of two lids that operate like double doors.

As shown in FIGS. 2, 4 and 6, the receptacle assembly 20 may be configured to support one or more power receptacles 74 and/or one or more jacks 78 in the support frame 12. As illustrated, the jacks 78 are Ethernet data ports, but it should be understood that the receptacle assembly can support any other type of jack, including coax, fiber optic, USB, VDI, serial, microphone, telephone, composite video, and audio output jacks. As shown, the receptacle assembly 20 may comprise a case 64 having a top surface 68 and lateral surfaces 70. The top surface 68 of the case 64 preferably defines appropriately sized openings 72 for accepting the power receptacles 74, the jacks 78 and the like. The power receptacles 74 and jacks 78 may be mounted through the openings 72 of the case 64 and snap-fit into the openings 72 or secured to the top surface 68 with fasteners (e.g., screws). Further, as shown in FIGS. 2, 4 and 6, the receptacle assembly 20 may be movably supported in the support frame 12 such that the receptacle assembly 20 can be translated up down within the support frame 12. It should be understood that the receptacle assembly 20 may support one or more jacks 78 without any power receptacles 74. It should also be understood that the receptacle assembly 20 may be adapted to support one or more power receptacles 74 without any jacks 78. Additionally, the receptacle assembly 20 can also be adapted to support other structures besides a power receptacle 74 or jack 78, such as a cable holder (not shown in the figures), which is a structure that permits a cable to pass through it but prevents a cable connector from passing through.

In one embodiment, as shown in FIGS. 2, 4 and 6, the translating mechanism 22 may be configured such that opening and closing of the lid 14 actuates the translating mechanism 22 to raise and lower the receptacle assembly 20 within the support frame 12. Thus, as the lid 14 is opened, the receptacle assembly 20 is raised; and as the lid 14 is closed, the receptacle assembly 20 is lowered. In the embodiment shown in FIGS. 2, 4 and 6, the translating mechanism 22 includes a gear 80, a rack 82 and pinion 84. The gear 80 is pivotally mounted on a pivot shaft 92 connected to the lateral support member 24. A lateral support portion 48 of the lid 14 is eccentrically connected to the gear 80 such that the opening and closing motion of the lid 14 causes the gear 80 to rotate about the pivot shaft 92 within a certain operational range. The pinion 84 may also pivotally mounted on a pivot shaft 94 connected to the lateral support member 24 such that the pinion 84 rotates about the pivot shaft 94 and properly engages the gear 80 fixed to lateral support portion 48 of the lid 14. The rack 82 may be mounted on the lateral surface 70 of the case 64 of the receptacle assembly 20 such that it properly engages the pinion 84 and is oriented on the lateral surface 70 of the case 64 such that the receptacle assembly 20 may be raised and lowered along substantially longitudinal axis of the support frame 12. The gear ratio of the gear 80 and the pinion 84 may be adapted such that rotation of the gear 80 fixed to the lid 14 provides a desired vertical translation of the rack 82 and the receptacle assembly 20. For example, as shown in the embodiment of FIGS. 1-4, the pinion 84 may comprise two gears 88, 90 having different gear ratios with respect to the gear 80. The gears 88 and 90 are fixedly connected to each other such that they rotate together coaxially about the pivot shaft 94. One gear 88 interfaces with the gear 80 and the other gear 90 interfaces with the rack 82. Although the translating mechanism 22 is herein described in terms of the gear 80 and the rack 82 and the pinion 84 of a preferred embodiment, the translating mechanism 22 may be provided by other suitable structures and/or mechanisms known in the art without departing from the principles of the invention.

Figure 8:
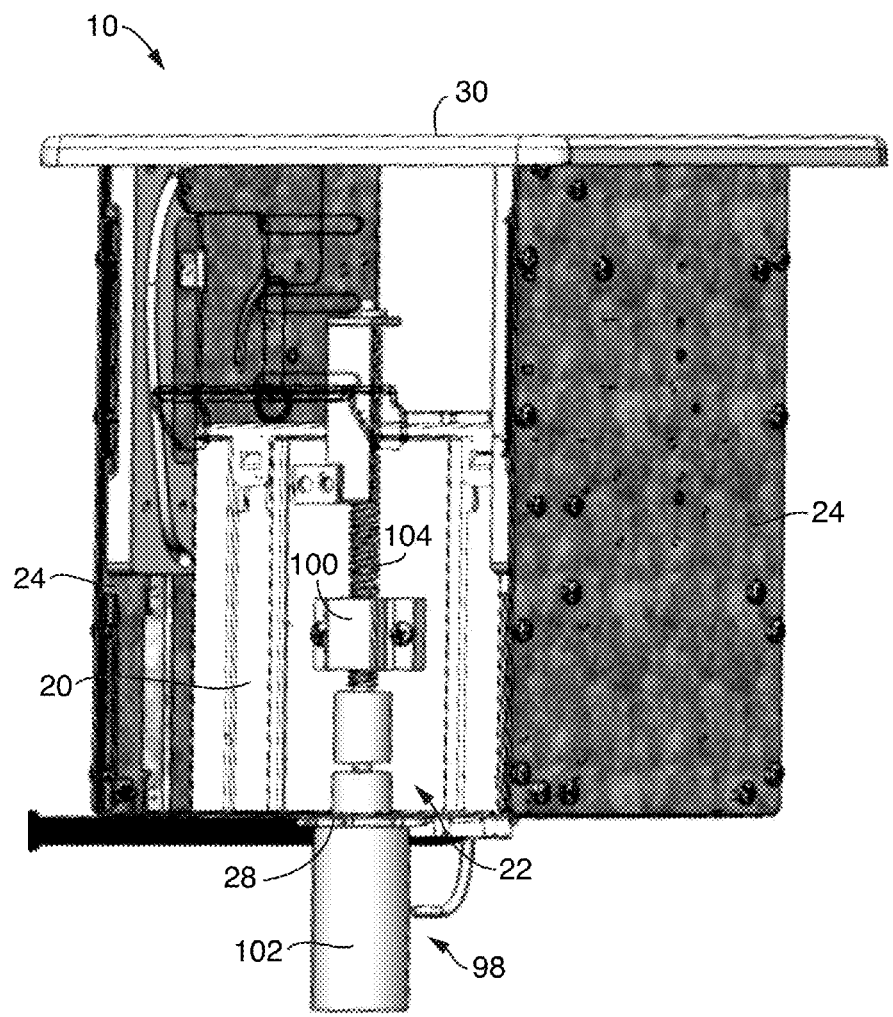
FIG. 8 is perspective view of the rising receptacle box assembly of FIG. 1 with a motorized linear actuator.

In another embodiment, as shown in FIG. 8, the translating mechanism 22 may comprise an actuator 98 and a bracket 100 configured to raise and lower the receptacle assembly 20 within the support frame 12. The actuator 98 may comprise a motor 102 with a lead screw 104 coupled to the output shaft of the motor. The motor 102 may be attached to the bottom support member 28 and the bracket 100 may be attached to the receptacle assembly 20. The bracket 100 is configured to retain the lead screw 104 such that rotation of the lead screw 104 by the motor 102 causes the receptacle assembly 20 to be translated up and down within the support frame 12. The translating mechanism 22 may further comprise a control switch for actuating the motor 102 and translating the receptacle assembly 20 up and down. Although the actuator 98 of FIG. 8 is shown as the motor 102 with the lead screw 104, it should be understood that actuator 98 may comprise any other suitable type of powered actuator arrangement for raising and lowering the receptacle assembly 20.

In one embodiment, the actuator 98 of FIG. 8 may be used in an embodiment of the translating mechanism 22 that couples the movement of the lid 14 with the movement of the receptacle assembly 20 (e.g., the translating mechanism 22 described above and shown in FIGS. 2, 4 and 6). Accordingly, the actuator 98 of FIG. 8 may be actuated to raise and lower the receptacle assembly 20 and correspondingly open and close the lid 14. In another embodiment, the actuator 98 of FIG. 8 may be used in an embodiment of the translating mechanism 22 that does not couple the movement of the lid 14 with the movement of the receptacle assembly 20. Accordingly, the actuator 98 of FIG. 8 may be actuated to raise and lower the receptacle assembly 20 without opening and closing of the lid 14.

Figure 2:
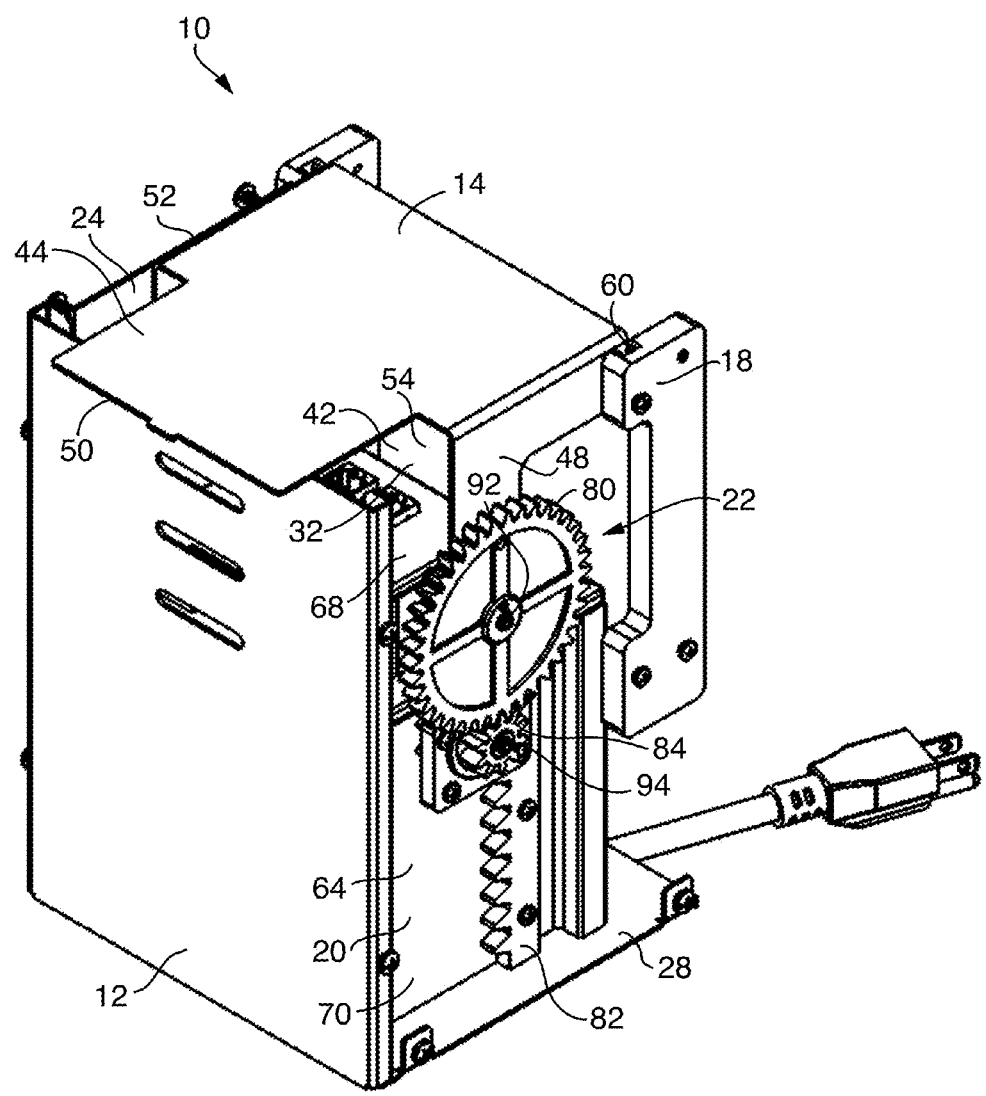
FIG. 2 is a cutaway view of the rising receptacle box assembly of FIG. 1 with the lid in a closed position.

In operation, as shown in the embodiment illustrated in FIGS. 1-7, movement of the lid 14 and the receptacle assembly 20 may be coupled such that movement of either the lid 14 or the receptacle assembly 20 results in a corresponding movement of the other. Further, as shown in FIGS. 1-2, when the lid 14 is in a closed position, the receptacle assembly 20 is in a lowered position. And as shown in FIG. 5-6, when the lid 14 is in an open position, the receptacle assembly 20 is in a raised position. Accordingly, as shown in FIGS. 5-6, when the lid 14 is in an open position, the top surface 68 of the receptacle assembly 20 is substantially level with a plane defined by the upper opening 42 of the support frame 12 so that the power receptacles 74 and jacks 78 supported on the top surface 68 of the receptacle assembly 20 are easily accessible for inserting various plugs and connectors. And as shown in FIGS. 1-2, when the lid 14 is in a closed position, the top surface 68 of the receptacle assembly 20 is lowered beneath the surface 44 of the lid 14 so that the power receptacles 74 and jacks 78 supported on the top surface 68 of the receptacle assembly 20 and any plugs or connectors inserted therein are retracted into the support frame 12 and stowed away in a recess below the work surface 11. As described above with reference to FIGS. 1-2, the lid 14 has cutouts 54 such that corresponding wires/cables 55 can pass through into the inner space 32 of the support frame 12 when the lid 14 is closed and the receptacle assembly 20 is lowered.

In the device shown in FIGS. 1-7, movement of the lid 14 from a closed position to an open position causes the gear 80, which is fixed to a lateral support portion 48 of the lid 14, to rotate. As the gear 80 rotates, the pinion 84 rotates, which causes the rack 82 and the case 64 of the receptacle assembly 20 to translate upward. Thus, as the lid 14 is opened, the top surface 68 of the case 64 with the power receptacles 74 and jacks 78 disposed thereon can be raised to a position substantially level with a plane defined by the upper opening 42 of the support frame 12 so that the power receptacles 74 and jacks 78 disposed on the top surface 68 of the receptacle assembly 20 are easily accessible. When the lid 14 is moved to a fully open position, the lid 14 engages the interference 62, which locks the lid 14 in an open position. As such, any downward force on the receptacle assembly 20 does not cause the lid 14 to move to a closed position, because the rack 82 attached to the case 64 cannot move down, because the pinion 84 cannot rotate, because the gear 80 cannot rotate, because the lid 14 is locked in position. However, once the lid 14 is manipulated to disengage the interference 62, the lid 14 can be moved to a closed position, which causes the gear 80 to rotate in a reverse direction, which causes the pinion 84 to rotate and the rack 82 and the case 64 to translate downward.

Additionally, in another embodiment, the actuator 98 of FIG. 8 may be used in conjunction with the gear 80, the rack 82 and the pinion 84. Accordingly, the actuator 98 of FIG. 8 may be actuated to raise and lower the receptacle assembly 20 and correspondingly open and close the lid 14. For instance, a control switch may be used to actuate the motor 102 and translate the receptacle assembly 20 up or down. The translation of the receptacle assembly 20 would cause the rack 82, which is fixed to the receptacle assembly 20, to rotate the pinion 84. Rotation of the pinion 84 would in turn cause rotation of the gear 80. Thus, the lid 14, which is attached to the gear 80, would move between an open and closed position as a result of the translation of the receptacle assembly 20 caused by the actuator 98.

In another embodiment, the opening and closing of the lid 14 may be independent of the raising and lowering of the receptacle assembly 20. For example, the lid 14 may be opened and closed manually and the receptacle assembly 20 may be raised and lowered by the actuator 98 of FIG. 8. For instance, the lid 14 may be opened manually and a control switch may be used to actuate the motor 102 and raise the receptacle assembly 20. The receptacle assembly 20 may be raised so that the power receptacles 74 and jacks 78 disposed on the top surface 68 of the receptacle assembly 20 are substantially level with a plane defined by the upper opening 42 of the support frame 12 so that the power receptacles 74 and jacks 78 disposed on the top surface 68 of the receptacle assembly 20 are easily accessible. The control switch may be used to actuate the motor 102 and lower the receptacle assembly 20 so that inserted plugs and connectors are retracted into the rising receptacle box assembly 10 and stowed away in a recess below the work surface 11. The lid 14 may be manually closed so that the device plugs remain below the surface of the closed the lid 14, which is substantially flush with the work surface 11. As described above with reference to FIGS. 1-2, the lid 14 has cutouts 54 such that associated wires/cables 55 can pass through into the inner space 32 of the support frame 12 when the lid 14 is closed and the receptacle assembly 20 is lowered.

In another embodiment, manually opening of the lid may actuate a control switch, which causes the motor 102 to raise the receptacle assembly 20. Manually closing the lid actuates the same control switch or another control switch, which causes the motor 102 to lower the receptacle assembly.

While the present invention has been described with reference to an illustrative embodiment, it will be appreciated by those of ordinary skill in the art that modifications can be made to the exemplary embodiments illustrated in FIGS. 1-8 without departing from the spirit and scope of the invention as a whole. Also, it is to be understood that the invention is not limited to the particular embodiments described herein. Further, it is to be understood that the terminology used is for the purpose of describing particular embodiments only, and is not intended to limit the scope of the claims of the present application.

What is claimed is:

1. A rising receptacle box assembly comprising:
    a box defining an inner space and an upper opening;
    a lid movably supported on the box, the lid being configured to move between a closed position and an open position, the lid being disposed over at least a portion of the upper opening of the box in a closed position; and
    a receptacle assembly configured to house at least one receptacle or jack, the receptacle assembly being movably supported inside the inner space of the box such that the receptacle assembly can linearly translate between a lowered position and a raised position inside the inner space of the box;
    wherein the lid is operably connected to the receptacle assembly such that linear translation of the receptacle assembly from the lowered position to the raised position is coupled to movement of the lid from the closed position to the open position.

2. The rising receptacle box assembly of claim 1 further comprising a guiding mechanism for guiding the movement of the lid relative to the box.

3. The rising receptacle box assembly of claim 2, wherein the guiding mechanism includes at least one pin slidably engaged with at least one track, said at least one pin provided on the lid.

4. The rising receptacle box assembly of claim 3, wherein the pin is provided on a lateral support portion of the lid.

5. The rising receptacle box assembly of claim 2, wherein the guiding mechanism includes an interference that locks the lid when the lid is in the open position.

6. The rising receptacle box assembly of claim 5, wherein the box includes a flange, the flange being configured such that when the box is inserted into the opening of a work surface, the flange is substantially level with the work surface, the interference being an inner edge of the flange.

7. The rising receptacle box assembly of claim 1, further comprising a translating mechanism for operably connecting the lid and the receptacle assembly, wherein the translating mechanism comprises:
    a gear pivotally mounted on the box, wherein the lid is eccentrically connected to the gear;
    a pinion pivotally mounted on the box and engaged with the gear; and
    a rack mounted on the receptacle assembly and engaged with the pinion.

8. The rising receptacle box assembly of claim 1, further comprising an actuator supported on the box and connected to the receptacle assembly, the actuator being configured to move the receptacle assembly between the lowered position and the raised position.

9. The rising receptacle box assembly of claim 8, wherein the actuator comprises:
    a motor with an output shaft; and
    a lead screw connected to the output shaft of the motor;
    wherein the motor is supported on the box and the lead screw is connected to the receptacle assembly.

10. The rising receptacle box assembly of claim 1, wherein the lid comprises a substantially planar surface that defines at least one cutout configured to allow cables to pass through into the inner space of the box when the lid is in a closed position.

11. The rising receptacle box assembly of claim 1, wherein the lid is operably connected to the receptacle assembly such that movement of the receptacle assembly from the raised position to the lowered position occurs in conjunction with movement of the lid from the open position to the closed position.

12. A rising receptacle box assembly comprising:
    a box defining an inner space and an upper opening;
    a lid movably supported on the box, the lid being configured to move between a closed position and an open position, the lid being disposed over at least a portion of the upper opening of the box in a closed position; and
    a receptacle assembly configured to house at least one receptacle or jack, the receptacle assembly being movably supported inside the inner space of the box such that the receptacle assembly can move between a lowered position and a raised position inside the inner space of the box;
    wherein the lid is operably connected to the receptacle assembly by a translating mechanism such that movement of the lid from the closed position to the open position causes the receptacle assembly to move from the lowered position to the raised position and movement of the lid from the open position to the closed position causes the receptacle assembly to move from the raised position to the lowered position.

13. The rising receptacle box assembly of claim 12, further comprising a translating mechanism for operably connecting the lid and the receptacle assembly, wherein the translating mechanism comprises:
    a gear pivotally mounted on the box, wherein the lid is eccentrically connected to the gear;
    a pinion pivotally mounted on the box and engaged with the gear; and
    a rack mounted on the receptacle assembly and engaged with the pinion.

14. The rising receptacle box assembly of claim 12, wherein, in the raised position, a top surface of the receptacle assembly is substantially level with a plane defined by the upper opening of the box.

15. A rising receptacle box assembly comprising:

a box defining an inner space and an upper opening;

a receptacle assembly comprising a top surface configured to support at least one receptacle or jack, the receptacle assembly being movably supported inside the inner space of the box such that the receptacle assembly can linearly translate between a lowered position and a raised position inside the inner space of the box; and a translating mechanism supported on the box and connected to the receptacle assembly, the translating mechanism being configured to linearly translate the receptacle assembly between the lowered position and the raised position inside the inner space of the box;

wherein, in the raised position, the top surface of the receptacle assembly is substantially level with a plane defined by the upper opening of the box; and wherein, in the lowered position, the top surface of the receptacle assembly is disposed below the plane defined by the upper opening of the box.

16. The rising receptacle box assembly of claim 15, further comprising a lid configured to move between a closed position and an open position, the lid being disposed over at least a portion of the upper opening of the box in a closed position and the lid being disposed substantially inside the inner space of the box in an open position.

17. The rising receptacle box assembly of claim 16, wherein the lid comprises a planar surface defining at least one cutout configured to allow cables to pass through into the inner space of the box when the lid is in a closed position.

18. The rising receptacle box assembly of claim 15, wherein the translating mechanism comprises a powered actuator supported on the box and connected to the receptacle assembly, the powered actuator being configured to move the receptacle assembly between a lowered position and a raised position inside the inner space of the box.

19. The rising receptacle box assembly of claim 18, wherein the actuator comprises:

a motor with an output shaft; and a lead screw connected to the output shaft of the motor;

wherein the motor is supported on the box and the lead screw is connected to the receptacle assembly.

* * * * *